United States Patent
Durham et al.

(10) Patent No.: US 8,281,122 B2
(45) Date of Patent: Oct. 2, 2012

(54) GENERATION AND/OR RECEPTION, AT LEAST IN PART, OF PACKET INCLUDING ENCRYPTED PAYLOAD

(75) Inventors: David M. Durham, Beaverton, OR (US); Men Long, Portland, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 12/396,125

(22) Filed: Mar. 2, 2009

(65) Prior Publication Data
US 2010/0223457 A1 Sep. 2, 2010

(51) Int. Cl.
*H04L 29/06* (2006.01)
(52) U.S. Cl. ........ 713/152; 713/150; 713/151; 713/153; 726/13; 726/22; 726/23; 726/24; 726/25
(58) Field of Classification Search .................... 713/152
See application file for complete search history.

(56) References Cited

U.S. PATENT DOCUMENTS

| | | | |
|---|---|---|---|
| 2003/0061481 A1* | 3/2003 | Levine et al. | 713/163 |
| 2003/0200176 A1* | 10/2003 | Foster et al. | 705/51 |
| 2005/0135318 A1* | 6/2005 | Walton et al. | 370/338 |
| 2005/0165770 A1* | 7/2005 | Go et al. | 707/3 |
| 2005/0180568 A1* | 8/2005 | Krause | 380/212 |
| 2006/0129830 A1* | 6/2006 | Haller et al. | 713/183 |
| 2006/0218390 A1* | 9/2006 | Loughran et al. | 713/151 |
| 2007/0186281 A1* | 8/2007 | McAlister | 726/14 |
| 2007/0255947 A1* | 11/2007 | Choudhury et al. | 713/161 |
| 2008/0046730 A1* | 2/2008 | Han et al. | 713/171 |
| 2008/0244268 A1 | 10/2008 | Durham et al. | |

OTHER PUBLICATIONS

Information Sciences Institute, University of Southern California RFC 791: Internet Protocol DARPA Internet Program Protocol Specification 1981 The Internet Engineering Task Force (IETF) pp. 1-15.*
Freier, A. O., et al., "The SSL Protocol", Version 3.0, Transport Layer Security Working Group, Internet-Draft, Netscape Communications, <draft-ietf-tls-ssl-version3-00.txt>, Nov. 18, 1996, 1-63 pgs.
Rescorla, E. et al., "Datagram Transport Layer Security version 1.2", Internet-Draft, <draft-ietf-tls-rfc4347-bis-01.txt>, Nov. 2008, 1-28 pgs.
Eastlake, D., "Transport Layer Security (TLS) Extensions: Extension Definitions", TLS Working Group, Internet Draft, 3rd EastLake Enterprises, <draft-ietf-tls-rfc4366-bis-03.txt>, Oct. 5, 2008, 1-28 pgs.

(Continued)

*Primary Examiner* — Jung Kim
*Assistant Examiner* — Adrian Stoica
(74) *Attorney, Agent, or Firm* — Christopher K. Gagne (57) ABSTRACT

An embodiment may include circuitry to generate, at least in part, and/or receive, at least in part, a packet. The packet may include at least one field and an encrypted payload. The at least one field may include, at least in part, a first key and/or at least one value. The first key and at least one value, as included in the at least one field, may be encrypted by a second key. The encrypted payload may be capable of being decrypted, at least in part, based, at least in part, upon the first key and/or the at least one value to yield an unencrypted payload. The unencrypted payload may include at least a portion of application layer data that is to be communicated in a secure session.

19 Claims, 5 Drawing Sheets

OTHER PUBLICATIONS

Dierks, T. et al., "The Transport Layer Security (TLS) Protocol", Version 1.2, Network Working Group, Aug. 2008,1-104 pgs.

Postel, J., "User Datagram Protocol", RFC 768, Aug. 28, 1980, 1-3 pgs.

Krawczyk, H. et al., "HMAC: Keyed-Hashing for Message Authentication", Network Working Group, Feb. 1997,1-11 pgs.

Kent, S. et al., "Security Architecture for the Internet Protocol", Network Working Group, Nov. 1998,1-66 pgs.

Eastlake, D. et al., "US Secure Hash Algorithm 1 (SHA1)", Network Working Group, Sep. 2001,1-22 pgs.

Kent, S. et al., "Security Architecture for the Internet Protocol", Network Working Group, Dec. 2005,1-101 pgs.

Dierks, T. et al., "The Transport Layer Security (TLS) Protocol", Version 1.1, Network Working Group; Apr. 2006,1-87 pgs.

Blake-Wilson, S. et al., "Transport Layer Security (TLS) Extensions", Network Working Group, Apr. 2006,1-30 pgs.

Salowey, J. et al., "Transport Layer Security (TLS) Session Resumption without Server-Side State", Network Working Group, May 2006,1-17 pgs.

"Scalable End-to-End Security", Entire Internet Securely Connected to One Server, 2008,1-2 pgs.

\* cited by examiner

GENERATION AND/OR RECEPTION, AT LEAST IN PART, OF PACKET INCLUDING ENCRYPTED PAYLOAD

FIELD

This disclosure relates to generation and/or reception, at least in part, of a packet that includes an encrypted payload.

BACKGROUND

In one conventional arrangement, a first network node is coupled to a second network node, and the second network node is coupled to a third network node. An application layer data buffer is encrypted, in accordance with a security protocol, in the first network node and the resultant encrypted data buffer is fragmented or segmented, in accordance with a transport layer protocol, for transport in a plurality of frames to the third network node via the second network node. The third network node re-assembles, in accordance with the transport layer protocol, the fragments of encrypted data from the plurality of frames to produce the encrypted data buffer. The third network node then decrypts, in accordance with the security protocol, the re-assembled data buffer to reproduce the application layer data buffer.

In this conventional network arrangement, it is difficult for the second network node to perform meaningful inspection of and/or other analysis upon the encrypted data fragments traversing the second network node from the first network node to the third network node. This arises from a number of factors. For example, in this conventional arrangement, the fragments, as initially received by the second network node, are encrypted, and decryption is a pre-requisite to performing such meaningful inspection and/or other analysis. However, in this conventional arrangement, re-assembly of the encrypted fragments into the entire encrypted data buffer is a pre-requisite to such decryption, since this conventional arrangement is incapable of separately decrypting the individual encrypted fragments (e.g., apart from the re-assembled entire encrypted data buffer). Such re-assembly involves substantial use of a transport layer state and cryptographic information and buffering. Additionally, given the extensive deployment of existing standards-based transport and security protocols, modification of such existing protocols to ameliorate these problems would be difficult.

Furthermore, a relatively large number of connections may traverse the second network node. In this conventional arrangement, in order to perform such meaningful inspection and/or other analysis, the second network node associates each of these connections with its respective transport layer and cryptographic key, state, and/or other information, as well as, synchronizing, updating, maintaining, accessing, and utilizing the respective information for each of these connections. This may pose a significant connection scalability issue in this conventional arrangement that may significantly reduce both the number of connections that may be processed and the speed with which such processing may be carried out in this conventional arrangement. This problem may be further exacerbated if routing changes occur to active connections traversing the second network node.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
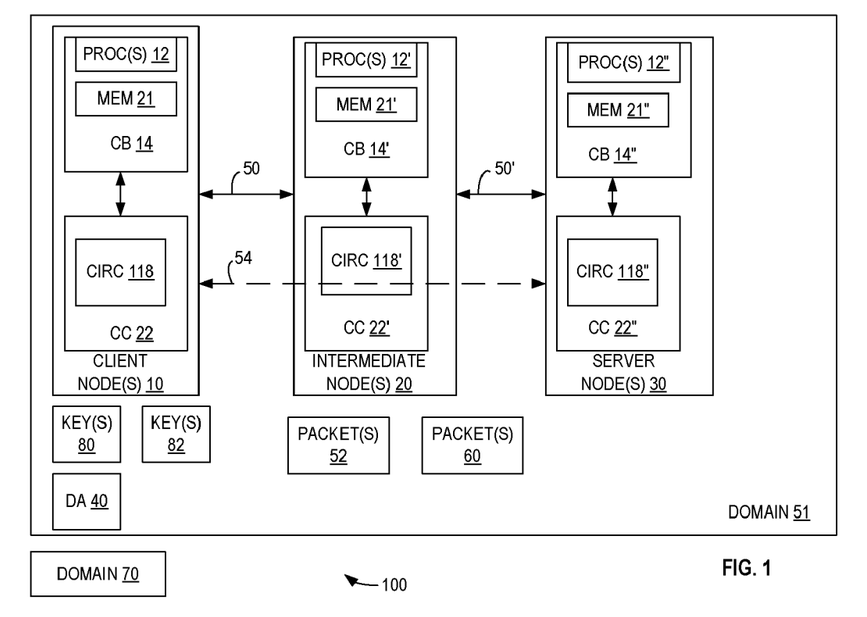
FIG. 1 illustrates a system embodiment.

FIG. 1 illustrates a system embodiment 100. System 100 may include one or more client network nodes 10 that may be communicatively coupled via one or more wireless and/or wired communication links 50 to one or more intermediate network nodes 20. One or more intermediate nodes 20 may be communicatively coupled via one or more wireless and/or wired communication links 50' to one or more server network nodes 30. In this embodiment, a "network node" or "node" may be used interchangeably to mean an entity communicatively coupled in and/or to a network, such as, for example, an end station, appliance, mass storage, intermediate station, network interface, client, server, and/or portion thereof In this embodiment, a "client," "client node," or "client network node" may be used interchangeably to mean a node that may comprise, but is not required to comprise, an end station. Also in this embodiment, an "intermediate node" or "intermediate network node" may be use used interchangeably to mean a node that may be communicatively coupled to a plurality of other nodes, and may provide, facilitate, and/or implement one or more services and/or functions, such as, for example, firewall, switching, forwarding, gateway, intrusion detection, load balancing, and/or routing services and/or functions. In this embodiment, a "server," "server node," or "server network node" may be used interchangeably to mean a node that may provide, facilitate, and/or implement one or more services and/or functions to one or more clients, such as, for example, data storage, retrieval, and/or processing functions. In this embodiment, a "network" may be or comprise two or more nodes that are communicatively coupled together. Also in this embodiment, a node may be "communicatively coupled" to another node if the one node is capable of transmitting to and/or receiving from the other node one or more commands and/or data. As used herein, a "wireless communication link" means any modality, and/or portion thereof, that permits, at least in part, at least two nodes to be wirelessly communicatively coupled, at least in part. As used herein, a "wired communication link" means any modality and/or portion thereof, that permits, at least in part, at least two nodes to be communicatively coupled, at least in part, via non-wireless means, at least in part. As used herein, data may be or comprise one or more commands, and/or one or more commands may be or comprise data.

One or more nodes 10 may comprise circuit board (CB) 14. CB 14 may be or comprise a system motherboard that may comprise one or more host processors 12 and computer-readable/writable memory 21. CB 14 may comprise one or more (not shown) connectors that may permit circuit card (CC) 22 to be electrically and mechanically mated with CB 14 such that components in CB 14 (for example, one or more processors 12 and/or memory 21) and CC 22 (for example, operative circuitry 118 comprised in CC 22) may be communicatively coupled to each other.

As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Alternatively or additionally, without departing from this embodiment, some or all of the circuitry comprised in one or more host processors 12 and/or memory 21 may be comprised in circuitry 118, and/or some or all of circuitry 118 may be comprised in one or more host processors 12 and/or one or more (not shown) integrated circuits that may be comprised in CB 14, such as, a not shown chipset that may be comprised in CB 14.

Each of the host processors 12 may be coupled to computer-readable/writable memory 21 via a not shown memory hub system. Each of the one or more host processors 12 may comprise, for example, a respective Intel® microprocessor (and/or chipset) that is commercially available from the Assignee of the subject application. As used herein, the terms "processor," may be used to mean circuitry capable of performing, at least in part, one or more arithmetic and/or logical operations. Of course, alternatively, each of the host processors 12 may comprise a respective microprocessor (and/or chipset) that is manufactured and/or commercially available from a source other than the Assignee of the subject application. One or more nodes 10 also may comprise a not shown user interface system that may comprise, e.g., a keyboard, pointing device, and display system that may permit a human user to input commands to, and monitor the operation of, system 100. Operative circuitry 118 may be communicatively coupled to one or more intermediate nodes 20 via one or more links 50.

One or more machine-readable program instructions may be stored in computer-readable/writable memory 21. In operation of one or more nodes 10, these instructions may be accessed and executed by one or more host processors 12 and/or circuitry 118. When executed by one or more host processors 12 and/or circuitry 118, these one or more instructions may result in one or more host processors 12 and/or circuitry 118 performing the operations described herein as being performed by one or more host processors 12 and/or circuitry 118. Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other computer-readable and/or writable memory.

One or more intermediate nodes 20 may comprise CB 14'. CB 14' may be or comprise a system motherboard that may comprise one or more host processors 12' and computer-readable/writable memory 21'. CB 14' may comprise one or more (not shown) connectors that may permit CC 22' to be electrically and mechanically mated with CB 14' such that components in CB 14' (such as, for example, one or more processors 12' and/or memory 21') and CC 22' (such as, for example, operative circuitry 118' comprised in CC 22') may be communicatively coupled to each other. Alternatively or additionally, some or all of the circuitry comprised in one or more host processors 12' and/or memory 21' may be comprised in circuitry 118', and/or some or all of circuitry 118' may be comprised in one or more host processors 12' and/or one or more (not shown) integrated circuits that may be comprised in CB 14', such as for example, a not shown chipset that may be comprised in CB 14'.

Each of the host processors 12' may be coupled to computer-readable/writable memory 21' via a not shown memory hub system. Each of the one or more host processors 12' may comprise a respective Intel® microprocessor (and/or chipset) that is commercially available from the Assignee of the subject application. Alternatively, each of the host processors 12' may comprise a respective microprocessor (and/or chipset) that is manufactured and/or commercially available from a source other than the Assignee of the subject application, without departing from this embodiment. One or more intermediate nodes 20 also may comprise a not shown user interface system that may comprise, e.g., a keyboard, pointing device, and display system that may permit a human user to input commands to, and monitor the operation of, system 100. Operative circuitry 118' may be communicatively coupled both to one or more client nodes 10 via one or more links 50, and to one or more server nodes 30 via one or more links 50', respectively.

One or more machine-readable program instructions may be stored in computer-readable/writable memory 21'. In operation of one or more intermediate nodes 20, these instructions may be accessed and executed by one or more host processors 12' and/or circuitry 118'. When executed by one or more host processors 12' and/or circuitry 118', these one or more instructions may result in one or more host processors 12' and/or circuitry 118' performing the operations described herein as being performed by one or more host processors 12' and/or circuitry 118'. Memory 21' may comprise one or more of the types of memories that may be comprised in memory 21.

One or more server nodes 30 may comprise CB 14". CB 14" may be or comprise a system motherboard that may comprise one or more host processors 12" and computer-readable/writable memory 21". CB 14" may comprise one or more (not shown) connectors that may permit CC 22" to be electrically and mechanically mated with CB 14" such that components in CB 14" (for example, one or more processors 12" and/or memory 21") and CC 22" (for example, operative circuitry 118" that may be comprised in CC 22") may be communicatively coupled to each other. Alternatively or additionally, some or all of the circuitry comprised in one or more host processors 12" and/or memory 21" may be comprised in circuitry 118", and/or some or all of circuitry 118" may be comprised in one or more host processors 12" and/or one or more (not shown) integrated circuits that may be comprised in CB 14", such as a not shown chipset that may be comprised in CB 14".

Each of the host processors 12" may be coupled to computer-readable/writable memory 21" via a not shown memory hub system. Each of the one or more host processors 12" may comprise a respective Intel® microprocessor (and/or chipset) that is commercially available from the Assignee of the subject application. Alternatively, each of the host processors 12" may comprise a respective microprocessor (and/or chipset) that is manufactured and/or commercially available from a source other than the Assignee of the subject application, without departing from this embodiment. One or more server nodes 30 also may comprise a not shown user interface system that may comprise, e.g., a keyboard, pointing device, and display system that may permit a human user to input commands to, and monitor the operation of, system 100. Operative circuitry 118" may be communicatively coupled to one or more intermediate nodes 20 via one or more links 50'.

One or more machine-readable program instructions may be stored in computer-readable/writable memory 21". In operation of one or more server nodes 30", these instructions may be accessed and executed by one or more host processors 12" and/or circuitry 118". When executed by one or more host processors 12" and/or circuitry 118", these one or more instructions may result in one or more host processors 12" and/or circuitry 118" performing the operations described herein as being performed by one or more host processors 12" and/or circuitry 118". Memory 21" may comprise one or more of the types of memories that may be comprised in memory 21.

System 100 may comprise a plurality of domains 51 and 70. In this embodiment, a "domain" may comprise a plurality of nodes and a domain authority (DA). In this embodiment, a "domain authority" may comprise one or more entities capable of providing, implementing, and/or facilitating, at least in part, one or more functions, features, protocols, and/or operations related and/or involved in whole or in part to authentication, identification, and/or security. For example, domain 51 may comprise one or more client nodes 10, one or more intermediate nodes 20, one or more server nodes 30, and DA 40. Although not shown in FIG. 1, DA 40 may be communicatively coupled to one or more nodes 10, 20, and/or 30. Domain 70 may have similar or identical respective functions, components, and/or operations to the respective functions, components, and/or operations of domain 51. Alternatively or additionally, some or all of the functions and/or operations of DA 40 may be carried out by one or more intermediate nodes 20 and/or one or more server nodes 30.

One or more communication links 50 and/or 50' may be compatible with one or more communication protocols. Circuitry 118 may exchange data and/or commands with circuitry 118' and/or circuitry 118", in accordance with these one or more communication protocols. Similarly, circuitry 118' may exchange data and/or commands with circuitry 118", in accordance with these one or more communication protocols. For example, in this embodiment, one or more links 50 and/or 50' may be compatible with, e.g., an Ethernet protocol, Transmission Control Protocol/Internet Protocol (TCP/IP) protocol, Security Architecture for IP (IPsec), and/or Transport Layer Security (TLS) protocol.

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP protocol that may be utilized in system 100 may comply or be compatible with the protocols described in Internet Engineering Task Force (IETF) Request For Comments (RFC) 791 and 793, published September 1981. The IPsec protocol that may be utilized in system 100 may comply or be compatible with the protocol described in IETF RFC 4301, published December 2005. The TLS protocol that may be utilized in system 100 may comply or be compatible with the protocol described in IETF RFC 4346, "The Transport Layer Security (TLS) Protocol Version 1.1," published April 2006. Although specific reference will be made hereinafter to an embodiment that utilizes IP, TCP, and TLS protocols, of course, many different, additional, and/or other protocols may be used for such data and/or command exchange without departing from this embodiment, including for example, later-developed versions of the aforesaid and/or other protocols. For example, User Datagram Protocol (UDP) that may comply and/or be compatible with IETF RFC 768 published Aug. 28, 1980 may be alternatively used without departing from this embodiment.

Figure 3:
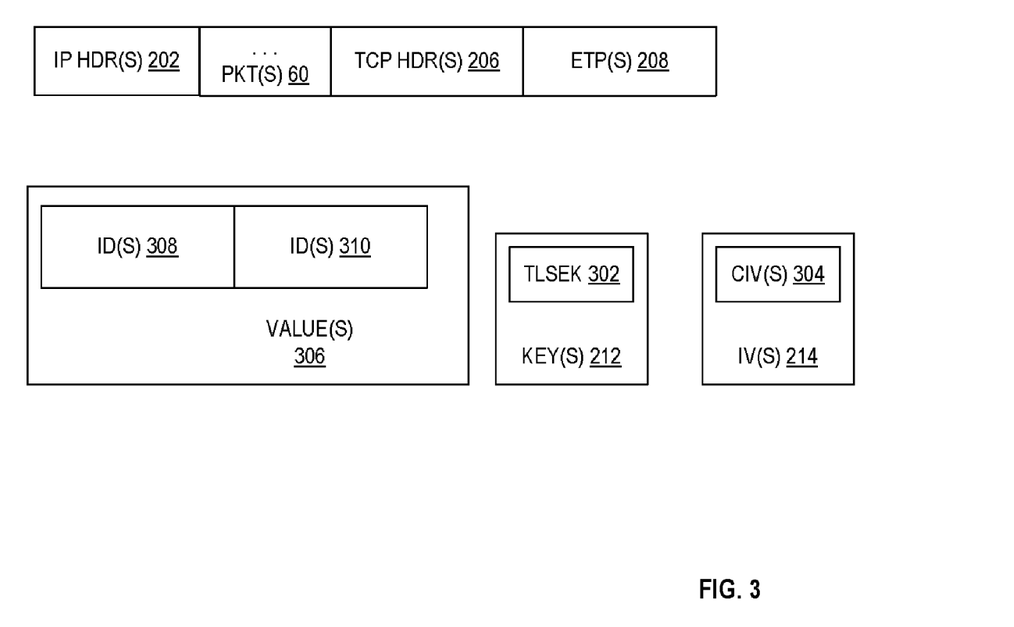
FIG. 3 illustrates one or more packets, keys, and values in an embodiment.

With reference now being made to FIGS. 1 to 4, operations 400 that may be performed in system 100 will be described. After a reset of system 100, circuitry 118 may exchange data and/or commands with circuitry 118", via one or more links 50, circuitry 118', and one or more links 50', that may result in establishment of one or more secure transport layer sessions 54 (e.g., according to, in compliance with, and/or compatible with TLS/IPsec protocol) between one or more client nodes 10 and one or more server nodes 30 via one or more intermediate nodes 20. As part of this data and/or command exchange, one or more server nodes 30 may transmit, in a secure fashion (e.g., as part of a TLS control channel handshake, an out-of-band technique involving TCP and/or IP options, and/or IPsec Internet Key Exchange) to one or more client nodes 10 one or more keys 82. Prior to transmitting one or more keys 82 to one or more clients 10, one or more servers 30 may generate, at least in part, one or more keys 82 based at least in part upon one or more cryptographic operations (e.g., comprising one or more one-way hashing functions) involving, at least in part, as input operands, one or more keys 80 and one or more values 306 (see FIG. 3). In this embodiment:

$$K2 = F(K1, V), \text{ where}$$

K1 is one or more keys 80, V is one or more values 306, K2 is one or more keys 82, and F is the one or more cryptographic transforms, such as one-way hashing functions, as described above.

One or more keys 80 may be generated, at least in part, by DA 40, and securely distributed, at least in part by DA 40, to one or more intermediate nodes 20 and/or one or more servers 30. However, DA 40 may maintain in secrecy from one or more client nodes 10 the one or more keys 80. One or more values 306 may be generated by one or more servers 30 based at least in part upon identifiers 308, 310 (e.g., one or more respective addresses, IPsec Security Parameter Indices, and/or other values) of the one or more client nodes 10 and the one or more servers 30, respectively. One or more identifiers 308 may uniquely identify one or more clients 10, and one or more identifiers 310 may uniquely identify one or more servers 30. In this embodiment, one or more values 306 may comprise a concatenation of one or more identifiers 308 with one or more identifiers 310.

In this embodiment, DA 40 may generate one or more keys 80 such that (1) one or more keys 80 may be uniquely associated with the domain 51, and (2) one or more keys 80 may be essentially unobtainable from one or more keys 82 (e.g., from a practical cryptographic standpoint). In an embodiment, one or more keys 80 may be or comprise one or more cryptographically strong random numbers. Thus, advantageously, as a result of these two factors, the maintenance of secrecy from the one or more clients 10 of one or more keys 80, and that, in this embodiment, the one or more keys 82 may be generated based at least in part upon the one or more keys 80 and one or more identifiers 308 and 310, this may permit one or more keys 82 to be uniquely associated with one or more clients 10. This may also prevent one or more clients 10 (e.g., from a practical cryptographic standpoint) from being able to determine one or more keys 80 and/or one or more other keys (not shown) that may be associated with other client nodes (not shown). Advantageously, this may enhance the security of communications between the client nodes and one or more servers 30 in domain 51. Also advantageously, one or more intermediate nodes 20 may be capable of dynamically generating (e.g., on a packet-by-packet basis), based at least in part upon one or more keys 80, one or more "wrapping" keys (such as, one or more keys 82) for use in obtaining respective session keys 302 from respective received packets received in respective sessions among one or more clients 10, intermediate nodes 20, and server nodes 30. In contrast to the prior art, this may permit one or more intermediate nodes 20 to be able to avoid (1) having to maintain persistent associations in memory between such sessions and wrapping and/or other keys, and/or (2) maintaining and using the substantial amount of transport layer and cryptographic state information and buffering for respective sessions, as required in the prior art.

Figure 4:
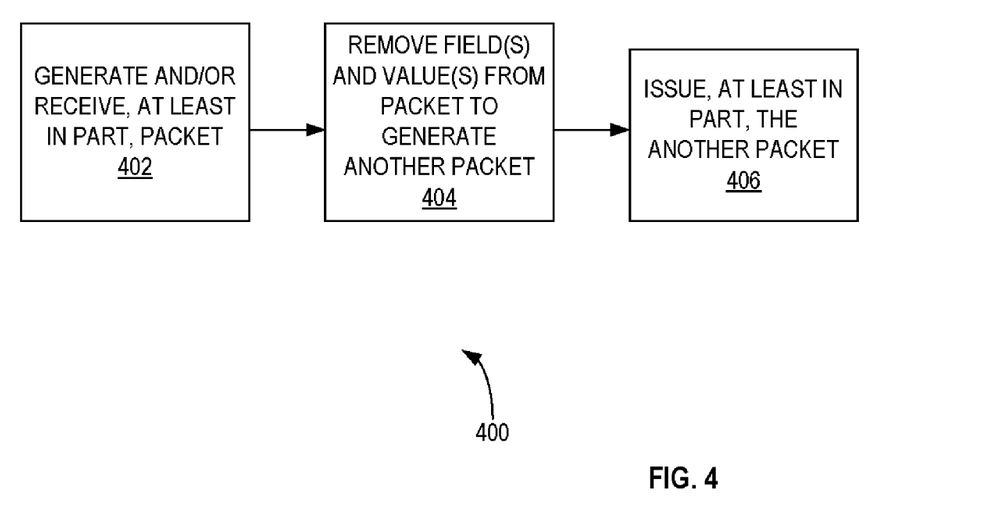
FIG. 4 is a flowchart illustrating operations in an embodiment.

After one or more servers 30 have provided to one or more clients 10 one or more keys 82, as illustrated by operation 402 in FIG. 4, circuitry 118 in one or more clients 10 may generate, at least in part, and issue, at least in part, to one or more servers 30, and/or circuitry 118" in one or more servers 30 may receive, at least in part, via one or more sessions 54 one or more packets 52. Although the following description will proceed with reference being made to one or more packets 52 being generated, at least in part, by circuitry 118 and issued, at least in part, by circuitry 118 to one or more servers 118", it should be understood that equivalent and/or corresponding operations may be executed in system 100 involving and/or that result in generation, at least in part, and issuance, at least in part, by circuitry 118" to one or more client nodes 10.

Figure 2:
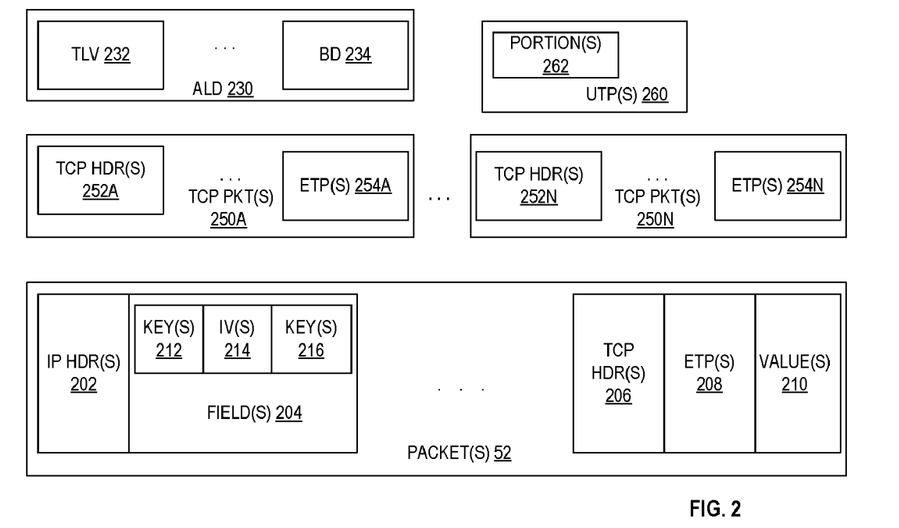
FIG. 2 illustrates one or more packets, application layer data, one or more fragments, and one or more payloads in an embodiment.

In this embodiment, one or more packets 52 may comprise (as shown in FIG. 2) a plurality of fields, including one or more IP headers 202, one or more fields 204, TCP headers 206, one or more encrypted TCP payloads (ETP) 208, and/or one or more values 210. One or more fields 204 may comprise at least in part, one or more keys 212, one or more initialization values (IV) 214, and/or one or more keys 216. As included in the one or more fields 204, one or more keys 212, one or more IV 214, and/or one or more keys 216 may be encrypted by one or more keys 82 based upon one or more cryptographic operations that may result in one or more keys 212, one or more IV 214, and/or one or more keys 216 being symmetrically encrypted in one or more fields 204. As a result of such symmetrical encryption, the resultant encryption of the one or more keys 212, one or more IV 214, and/or one or more keys 216 may be decrypted, at least in part, based at least in part upon one or more keys 82. In this embodiment, one or more fields 204 may comprise one or more TCP, IP, TLS, and/or IPsec header reserved and/or option fields.

One or more keys 212 may be or comprise one or more transport layer session encryption keys (TLSEK) 302 (see FIG. 3). In an embodiment, one or more keys 212 may be a single key (e.g., when used with a combined mode algorithm such as Advanced Encryption Standard (AES)-Galois/Counter Mode (GCM), described in AES Federal Information Processing Standards Publication 197, National Institute of Standards and Technology (NIST), Nov. 26, 2001 and "Recommendation for Block Cipher Modes of Operation: Galois/Counter Mode (GCM) and GMAC", NIST SP 800-38D, November 2007)). Alternatively, one or more keys 212 may be two discrete keys (e.g., when used in connection with a discrete mode algorithm such as AES/HMAC (IETF RFC 2104 published February 1997)-SHA1 (IETF RFC 3174 published September 2001)), such as if respective keys are used to provide data confidentiality and integrity, respectively. One or more IV 214 may be or comprise one or more cryptographic initialization vectors (CIV) 304. In this embodiment, one or more TLSEK 302 and/or one or more CIV 304 may facilitate and/or implement, at least in part, one or more secure sessions 54. In this embodiment, a cryptographic initialization vector may differ, at least in part, among the one or more packets comprised in one or more packets 52. Also, a cryptographic initialization vector may include all necessary cryptographic state information for a symmetric encryption algorithm to be able to decrypt, on a packet-by-packet basis independently of any other packet in the one or more packets 52, each of the packets comprised in the one or more packets 52. Such cryptographic state information essentially may comprise a summary based at least in part upon a cumulative cryptographic state (e.g., based at least in part upon previous packet payloads) in the secure session 54 and may permit the cryptographic initialization vector to properly initialize the decryption algorithm for a given payload being decrypted (e.g., based upon the previous cumulative cryptographic state for the secure session). Such cryptographic state information may differ depending upon, for example, the symmetric encryption algorithm and/or one or more modes associated therewith. For example, in Cipher Block Chaining (CBC) mode of AES, the cumulative cryptographic state may be associated with a current cipher/cryptographic block iteration associated with the encrypted payload, the unencrypted payload, and/or an authenticated payload. The cumulative cryptographic state may be, include, and/or be based at least in part upon a preceding cipher/cryptographic block iteration (e.g., from one or more payloads encrypted in one or more previous iterations of the algorithm). Depending upon the particular algorithm/mode implemented, the cryptographic state information may vary.

One or more ETP 208 (see FIG. 2) may be an encryption of one or more unencrypted TCP payloads (UTP) 260 that is generated based at least in part upon one or more symmetric encryption algorithms that utilize, as input operands, the one or more UTP 260, one or more TLSEK 302 and one or more CIV 304. As a result, one or more ETP 208 may be decrypted, in accordance with these one or more symmetric encryption algorithms, based at least in part upon these input operands, to yield the one or more UTP 260. These one or more symmetric encryption algorithms may be, comprise, or be compatible with CBC or Counter mode of operation of AES.

In this embodiment, UTP 260 may comprise one or more portions 262 of application layer data (ALD) 230 intended to be communicated via one or more sessions 54. ALD 230 may comprise TLS application data including TLS type/version/length (TVL) information 232 and application layer buffer data (BD) 234. BD 234 may be generated by and/or resulting from, at least in part, one or more not shown application layer processes executed by one or more host processors 12 and stored, at least in part, in memory 21. ALD 230 may be fragmented and encrypted (e.g., in accordance with the above one or more symmetric encryption algorithms that utilize one or more TLSEK 302 and one or more respective CIV 304) to provide respective ETP 254A . . . 254N. The respective ETP 254A . . . 254N may be associated (in respective TCP packets 250A . . . 250N) with respective TCP headers 252. The resultant TCP packets 250A . . . 250N may be respectively encapsulated into one or more packets 52 for transmission via one or more sessions 54.

As stated previously, one or more packets 52 also may comprise one or more values 210. In this embodiment, one or more values 210 may be one or more hash values generated based at least in part upon one or more UTP 260 and one or more keys 216. The one or more hash functions used to generate the one or more values 210 may be selected in such a way as to permit the one or more values 210 to operate as one or more message authentication codes that may be used to check payload validity (e.g., of the UTP 260 and/or one or more portions 262), at least in part. Alternatively, one or more values 210 may be one or more hash values generated based at least in part upon one or more ETP 208 and one or more keys 216, and may operate as one or more message authentication codes that may be used to check payload validity (e.g., of the ETP 208), at least in part.

In this embodiment, a "packet" may comprise one or more symbols and/or values. As used herein, a "field" may include one or more portions of at least one packet. As used herein, "encryption" and/or "encrypting" may comprise one or more operations comprised in, facilitating, and/or resulting in, at least in part, generation of cipher text from plaintext. Also as used herein, "decryption" and/or "decrypting" may comprise one or more operations comprised in, facilitating, and/or resulting in, at least in part, generation of plaintext from cipher text. As used herein, "plaintext" may include data that is, at least in part, encrypted and/or has already undergone and/or is presently undergoing encryption and/or decryption. Also as used herein, a "key" may comprise one or more symbols and/or values that may be used in encryption and/or decryption. Additionally, as used herein, a "session" may comprise an exchange of data and/or commands between or among at least two entities. As used herein, a "secure session" may comprise a session in which at least a portion of the data and/or commands is encrypted, at least in part.

In this embodiment, the generation of one or more keys 80 and/or one or more keys 82 may be carried out generally in accordance with, at least in part, principles disclosed in, e.g., commonly-assigned co-pending U.S. patent application Ser. No. 11/731,562, filed Mar. 30, 2007, and published Oct. 28, 2008, as Durham et al., U.S. Patent Application Publication No. U.S. 2008/0244268. Of course, many other, additional, and/or alternative techniques may be used to generate, at least in part, one or more keys 80 and/or one or more keys 82.

Figure 5:
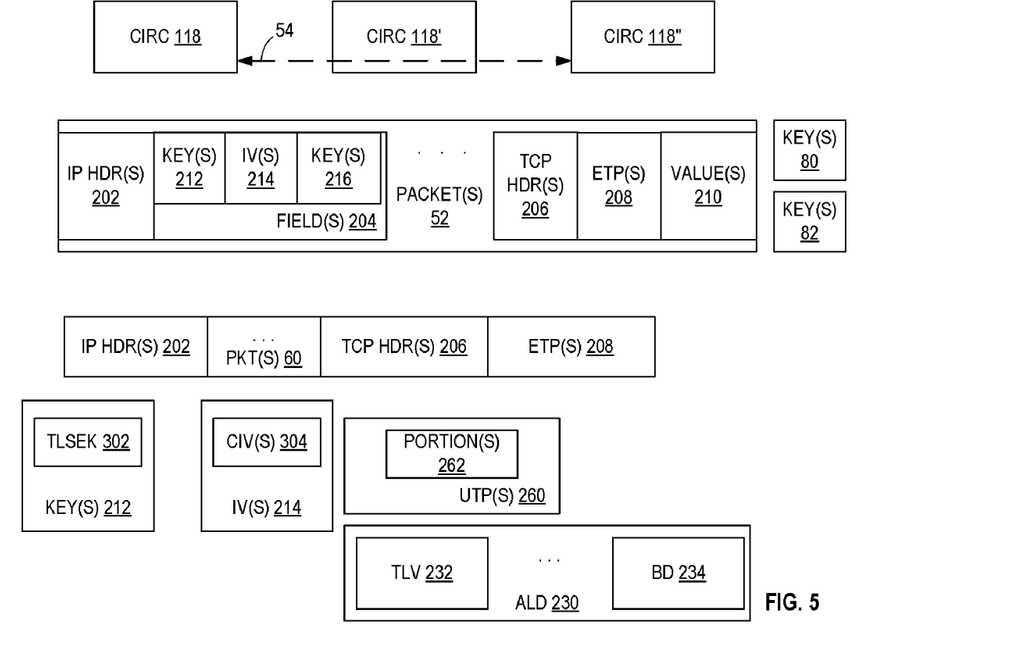
FIG. 5 illustrates elements of an embodiment involved in operations in the embodiment.

With particular reference now being made to FIG. 5, in operation, after one or more packets 52 are issued from one or more client nodes 10, one or more packets 52 may be received, at least in part, by circuitry 118' in one or more intermediate nodes 20. After circuitry 118' receives, at least in part, one or more packets 52, circuitry 118' may extract from one or more packets 52 one or more fields 204, one or more ETP 208, and/or one or more values 210. Circuitry 118' may decrypt, at least in part, one or more keys 212, one or more IV 214, and/or one or more keys 216 based at least in part upon one or more keys 82 and the one or more cryptographic operations used to encrypt one or more keys 212, one or more IV 214, and/or one or more keys 216. Circuitry 118' may obtain at least in part from the decrypted one or more keys 212 and one or more IV 214 one or more TLSEK 302 and one or more CIV 304, respectively. Based at least in part upon one or more TLSEK 302, one or more CIV 304, and the above one or more symmetric encryption algorithms that utilize one or more TLSEK 302 and one or more respective CIV 304, circuitry 118' may decrypt, at least in part, one or more ETP 208 to yield one or more UTP 260. Circuitry 118' then may recalculate the one or more hash values based at least in part upon the one or more keys 216 and the one or more UTP 260 previously decrypted, at least in part. Circuitry 118' may compare the recalculated one or more hash values to the one or more values 210 extracted from the one or more packets 52. If they do not match, circuitry 118' may determine that one or more packets 52 are invalid and/or corrupted and may drop one or more packets 52 (e.g., cease processing the one or more packets 52 and not transmit the one or more packets 52 to one or more servers 30). Conversely, if the recalculated one or more hash values match the one or more values 210 extracted from the one or more packets 52, circuitry 118' may analyze and/or inspect, at least in part, the contents of the UTP 260 to determine, for example, whether UTP 260 contains, at least in part, data and/or commands that may be considered to be malicious, unauthorized, and/or otherwise undesirable. If circuitry 118' determines that the UTP 260 may contain such data and/or commands, circuitry 118' may drop the one or more packets 52. Otherwise, circuitry 118' in one or more intermediate nodes 20 may re-generate and/or re-transmit, at least in part, one or more packets 52 to circuitry 118" in one or more server nodes 30 via one or more sessions 54.

After one or more packets 52 are transmitted, at least in part, from circuitry 118' to one or more server nodes 30, one or more packets 52 may be received, at least in part, by circuitry 118" in one or more server nodes 30. After circuitry 118" receives, at least in part, one or more packets 52, circuitry 118" may extract from one or more packets 52 one or more fields 204, one or more ETP 208, and/or one or more values 210. Circuitry 118" may decrypt, at least in part, one or more keys 212, one or more IV 214, and/or one or more keys 216 based at least in part upon one or more keys 82 and the one or more cryptographic operations used to encrypt one or more keys 212, one or more IV 214, and/or one or more keys 216. Circuitry 118" may obtain at least in part from the decrypted one or more keys 212 and one or more IV 214 one or more TLSEK 302 and one or more CIV 304, respectively. Based at least in part upon one or more TLSEK 302, one or more CIV 304, and the above one or more symmetric encryption algorithms that utilize one or more TLSEK 302 and one or more respective CIV 304, circuitry 118" may decrypt, at least in part, one or more ETP 208 to yield one or more UTP 260. Circuitry 118" then may recalculate the one or more hash values based at least in part upon the one or more keys 216 and the one or more UTP 260 previously decrypted, at least in part. Circuitry 118" may compare the recalculated one or more hash values to the one or more values 210 extracted from the one or more packets 52. If they do not match, circuitry 118" may determine that one or more packets 52 are invalid and/or corrupted and may cease processing the one or more packets 52. Conversely, if the recalculated one or more hash values match the one or more values 210 extracted from the one or more packets 52, circuitry 118" may analyze and/or inspect, at least in part, the contents of the UTP 260 to determine, for example, whether UTP 260 contains, at least in part, data and/or commands that may be considered to be malicious, unauthorized, and/or otherwise undesirable. If circuitry 118" determines that the UTP 260 may contain such data and/or commands, circuitry 118" may drop the one or more packets 52. Otherwise, circuitry 118" may transmit the UTP 260 and/or other portions of the one or more packets 52 to, for example, one or more not shown TLS, other protocol, and/or application processes in one or more nodes 30 for further processing. Alternatively or additionally, circuitry 118" may re-assemble, based at least in part upon one or more portions 262, ALD 230 for use by such one or more processes, and may signal (e.g., using metadata and/or external event signaling) such one or more processes that such re-assembly and/or related cryptographic processing has been done by circuitry 118". Advantageously, this may permit one or more host processors 12" to be better utilized for application and/or other processing (e.g., web-serving, data queries, etc.) instead of in carrying out these communication and/or cryptographic processes.

Alternatively or additionally, as stated above, one or more packets 52 may be transmitted from one or more server nodes 30 to one or more client nodes 10. In this case, after one or more packets 52 are issued from circuitry 118", one or more packets 52 may be received, at least in part, by circuitry 118' in one or more intermediate nodes 20. After circuitry 118' receives, at least in part, one or more packets 52, circuitry 118' may extract from one or more packets 52 one or more fields 204, one or more ETP 208, and/or one or more values 210.

Circuitry 118' may decrypt, at least in part, one or more keys 212, one or more IV 214, and/or one or more keys 216 based at least in part upon one or more keys 82 and the one or more cryptographic operations used to encrypt one or more keys 212, one or more IV 214, and/or one or more keys 216. Circuitry 118' may obtain at least in part from the decrypted one or more keys 212 and one or more IV 214 one or more TLSEK 302 and one or more CIV 304, respectively. Based at least in part upon one or more TLSEK 302, one or more CIV 304, and the above one or more symmetric encryption algorithms that utilize one or more TLSEK 302 and one or more respective CIV 304, circuitry 118' may decrypt, at least in part, one or more ETP 208 to yield one or more UTP 260. Circuitry 118' then may recalculate the one or more hash values based at least in part upon the one or more keys 216 and the one or more UTP 260 previously decrypted, at least in part. Circuitry 118' may compare the recalculated one or more hash values to the one or more values 210 extracted from the one or more packets 52. If they do not match, circuitry 118' may determine that one or more packets 52 are invalid and/or corrupted and may drop one or more packets 52 (e.g., cease processing the one or more packets 52 and not transmit the one or more packets 52 to one or more clients 10). Conversely, if the recalculated one or more hash values match the one or more values 210 extracted from the one or more packets 52, circuitry 118' may analyze and/or inspect, at least in part, the contents of the UTP 260 to determine, for example, whether UTP 260 contains, at least in part, data and/or commands that may be considered to be malicious, unauthorized, and/or otherwise undesirable. If circuitry 118' determines that the UTP 260 may contain such data and/or commands, circuitry 118' may drop the one or more packets 52. Otherwise, circuitry 118' in one or more intermediate nodes 20 may re-generate and/or re-transmit, at least in part, one or more packets 52 to circuitry 118 in one or more client nodes 10 via one or more sessions 54.

After one or more packets 52 are transmitted, at least in part, from circuitry 118' to one or more client nodes 10, one or more packets 52 may be received, at least in part, by circuitry 118. After circuitry 118 receives, at least in part, one or more packets 52, circuitry 118 may extract from one or more packets 52 one or more fields 204, one or more ETP 208, and/or one or more values 210. Circuitry 118 may decrypt, at least in part, one or more keys 212, one or more IV 214, and/or one or more keys 216 based at least in part upon one or more keys 82 and the one or more cryptographic operations used to encrypt one or more keys 212, one or more IV 214, and/or one or more keys 216. Circuitry 118 may obtain at least in part from the decrypted one or more keys 212 and one or more IV 214 one or more TLSEK 302 and one or more CIV 304, respectively. Based at least in part upon one or more TLSEK 302, one or more CIV 304, and the above one or more symmetric encryption algorithms that utilize one or more TLSEK 302 and one or more respective CIV 304, circuitry 118 may decrypt, at least in part, one or more ETP 208 to yield one or more UTP 260. Circuitry 118 then may recalculate the one or more hash values based at least in part upon the one or more keys 216 and the one or more UTP 260 previously decrypted, at least in part. Circuitry 118 may compare the recalculated one or more hash values to the one or more values 210 extracted from the one or more packets 52. If they do not match, circuitry 118 may determine that one or more packets 52 are invalid and/or corrupted and may cease processing the one or more packets 52. Conversely, if the recalculated one or more hash values match the one or more values 210 extracted from the one or more packets 52, circuitry 118 may analyze and/or inspect, at least in part, the contents of the UTP 260 to determine, for example, whether UTP 260 contains, at least in part, data and/or commands that may be considered to be malicious, unauthorized, and/or otherwise undesirable. If circuitry 118 determines that the UTP 260 may contain such data and/or commands, circuitry 118 may drop the one or more packets 52. Otherwise, circuitry 118 may transmit the UTP 260 and/or other portions of the one or more packets 52 to, for example, one or more not shown TLS, other protocol, and/or application processes in one or more nodes 10 for further processing. Alternatively or additionally, circuitry 118 may re-assemble, based at least in part upon one or more portions 262, ALD 230 for use by such one or more processes, and may signal (e.g., using metadata and/or external event signaling) such one or more processes that such re-assembly and/or related cryptographic processing has been done by circuitry 118. Advantageously, this may permit one or more host processors 12 to be better utilized for application and/or other processing (e.g., web-serving, data queries, etc.) instead of in carrying out these communication and/or cryptographic processes.

Alternatively, if one or more nodes in domain 51 (e.g., one or more server nodes 30) are incapable, at least in part, of appropriately processing one or more fields 204 and/or one or more values 210, circuitry 118' in one or more intermediate nodes 20 may generate (see operation 402 in FIG. 4) one or more other packets 60 by removing from one or more packets 52 one or more fields 204 and one or more hash values 210. For example, as shown in FIG. 3, one or more other packets 60 may comprise in whole or in part all of the fields of one or more packets 52, except that one or more other packets 60 may not comprise one or more fields 204 and one or more hash values 210. As illustrated by operation 404 in FIG. 4, after generating one or more other packets 60, circuitry 118' may issue, at least in part, the one or more other packets to circuitry 118" in one or more server nodes 30. Circuitry 118" may then process one or more packets 60 in accordance with conventional techniques. Advantageously, this may permit at least certain nodes (e.g., one or more clients 10 and/or one or more intermediate nodes 20) in domain 51 to operate in accordance with this embodiment, while permitting backward compatibility with one or more other nodes (e.g., one or more server nodes 30 and/or other not shown nodes external to the domain 51) that may operate in accordance with conventional techniques. Of course, the above principles may also be used if one or more packets 52 are transmitted from one or more servers 30 to one or more clients 10 without departing from this embodiment.

In an embodiment, one or more CIV 304 and/or one or more values 210 may include information to permit each of the one or more packets 52 to be self-describing cryptographically and/or for purposes of integrity check. Depending upon the cryptographic algorithm/mode used, one or more CIV 304 may include a counter value or a previous cipher block from one or more other packets (not shown) previously transmitted in session 54 to reflect the current cumulative cryptographic state. Similarly, depending upon the one or more hashing functions used, one or more values 210 may include respective hash values generated based upon encrypted and/or unencrypted payloads associated with both one or more previously transmitted packets and one or more packets 52. The one or more hashing functions may take into account the previously generated hash value included in one or more values 210 to calculate the current respective hash value. In this case, the last packet transmitted in session 54 that comprises data derived from ALD 230 may contain information reflective of both (1) the cumulative cryptographic state that would result from encrypting the entire ALD 230, taken as whole, and (2)

the hash value that would result based upon the entire ALD 230, taken as a whole. Advantageously, using the above information in one or more fields 204 and one or more values 210, one or more intermediate nodes 20 may be capable of performing packet-by-packet decryption, inspection, validity check, and/or analysis of each respective ETP, but may also be capable of providing to one or more servers 30 cryptographic state and hash value information based upon the entire ALD 230 without having to re-assemble the entire data buffer from which they were derived.

Thus, an embodiment may include circuitry to generate, at least in part, and/or receive, at least in part, a packet. The packet may include at least one field and an encrypted payload. The at least one field may include, at least in part, a first key and/or at least one value. The first key and at least one value, as included in the at least one field, may be encrypted by a second key. The encrypted payload may be capable of being decrypted, at least in part, based, at least in part, upon the first key and/or the at least one value to yield an unencrypted payload. The unencrypted payload may include at least a portion of application layer data that is to be communicated in a secure transport layer session.

Advantageously, as a result of including the one or more keys 212 and one or more IV 214 in each of the one or more packets 52, each respective ETP 208 in the one or more packets 52 may be decrypted independently of each other and without first having to re-assemble an entire data buffer from which they were derived. Advantageously, this may permit packet-by-packet decryption, inspection, validity check, and/or analysis of each respective ETP, without having to use the substantial amount of transport layer state and cryptographic information and buffering required in the prior art. Advantageously, this may reduce the amount of processing bandwidth consumed by security, communication, and/or cryptographic processing, while also improving the speed with which such processing may be carried out in this embodiment. Also advantageously, these features of this embodiment may permit such processing to be more easily implemented by specialized transport layer and/or cryptographic offload and/or acceleration hardware.

What is claimed is:

1. An apparatus comprising:
circuitry to at least one of generate, at least in part, and receive, at least in part, a packet, the packet including at least one field and an encrypted payload, the at least one field including, at least in part, at least one of a first key and at least one value, the at least one of the first key and at least one value, as included in the at least one field, being encrypted by a second key, the encrypted payload being capable of being decrypted, at least in part, based, at least in part, upon the at least one of the first key and the at least one value to yield an unencrypted payload, the unencrypted payload including at least a portion of application layer data, the application layer data to be communicated in a secure session;
the at least one field comprising at least one of:
one or more protocol header option fields; and
one or more protocol header reserved fields;
the circuitry to be comprised, at least in part, in a network node that is to be communicatively coupled to another network node that is to receive the packet;
if the another network node is incapable of processing the at least one field and is to operate in accordance with a technique that does not utilize the at least one field, the circuitry is to remove from the packet the at least one field to generate another packet that lacks the at least one field so as to permit the another packet to be backward compatible with the another network node, and the circuitry is to issue, at least in part, the another packet to the another network node;
the packet being one of a plurality of packets that comprise respective encrypted transmission control protocol payloads, respective fields, and respective values, the respective fields and respective values including information to permit the circuitry to perform packet-by-packet decryption, inspection, and validity check of each of the respective encrypted transmission control protocol payloads independently of others of the respective encrypted transmission control protocol payloads and without first re-assembling an entirety of the application layer data; and
if the another network node is capable of processing the at least one field, the information being to provide to the another network node cryptographic state and hash value information based upon an entirely of the application layer data.

2. The apparatus of claim 1, wherein:
the at least one field includes both the first key and the at least one value, the first key and the at least one value, as included in the at least one field, being encrypted by the second key;
the packet also includes a hash value to be used to check, at least in part, payload validity, the hash value being generated based at least in part upon a third key and at least one of the encrypted payload and the unencrypted payload;
the first key comprises a transport layer session encryption key; and
the at least one value comprises a cryptographic initialization vector.

3. The apparatus of claim 1, wherein:
the apparatus also comprises a circuit card that includes, at least in part, the circuitry, the circuit card being capable of being coupled to a circuit board, a server node, and a client node.

4. The apparatus of claim 1, wherein:
the second key is generated based at least in part upon a third key and at least one other value, the third key being associated with a domain, the domain including a client node and a server node, the at least one other value being generated based at least in part upon identifiers of the client node and the server node.

5. The apparatus of claim 4, wherein:
the third key is generated, at least in part, by a domain authority that distributes, at least in part, the third key to an intermediate node and to the server node, but maintains the third key in secrecy from the client node; and
the second key is generated based at least in part upon a one-way function involving the third key and the at least one other value.

6. The apparatus of claim 1, wherein:
the packet includes a hash value to check the validity of at least one of the encrypted payload and the unencrypted payload;
an intermediate node is to check, based at least in part upon the hash value, the validity; and
at least one of the intermediate node and a server node is to (1) decrypt, based upon at least in part upon the second key, the at least one of the first key and the at least one value as included in the at least one field, and (2) decrypt the encrypted payload based at least in part upon the at least one of the first key and the at least one value.

7. The apparatus of claim 6, wherein:

the at least one value comprises certain information based at least in part upon cumulative cryptographic state in the session, the cumulative cryptographic state being associated with a current cryptographic block iteration associated with one or more of the unencrypted payload, the encrypted payload, and an authenticated payload, the cumulative cryptographic state being based at least in part upon a preceding cryptographic block iteration.

8. A method carried out at least in part by circuitry, the method comprising:

at least one of generating, at least in part, and receiving, at least in part, a packet, the packet including at least one field and an encrypted payload, the at least one field including, at least in part, at least one of a first key and at least one value, the at least one of the first key and at least one value, as included in the at least one field, being encrypted by a second key, the encrypted payload being capable of being decrypted, at least in part, based, at least in part, upon the at least one of the first key and the at least one value to yield an unencrypted payload, the unencrypted payload including at least a portion of application layer data, the application layer data to be communicated in a secure session;

the at least one field comprising at least one of:
one or more protocol header option fields; and
one or more protocol header reserved fields;

the circuitry to be comprised, at least in part, in a network node that is to be communicatively coupled to another network node that is to receive the packet;

if the another network node is incapable of processing the at least one field and is to operate in accordance with a technique that does not utilize the at least one field, the circuitry is to remove from the packet the at least one field to generate another packet that lacks the at least one field so as to permit the another packet to be backward compatible with the another network node, and the circuitry is to issue, at least in part, the another packet to the another network node;

the packet being one of a plurality of packets that comprise respective encrypted transmission control protocol payloads, respective fields, and respective values, the respective fields and respective values including information to permit the circuitry to perform packet-by-racket decryption, inspection, and validity check of each of the respective encrypted transmission control protocol payloads independently of others of the respective encrypted transmission control protocol payloads and without first re-assembling an entirety of the application layer data; and if the another network node is capable of processing the at least one field, the information being to provide to the another network node cryptographic state and hash value information based upon an entirely of the application layer data.

9. The method of claim 8, wherein:

the at least one field includes both the first key and the at least one value, the first key and the at least one value, as included in the at least one field, being encrypted by the second key;

the packet also includes a hash value to be used to check, at least in part, payload validity, the hash value being generated based at least in part upon a third key and at least one of the encrypted payload and the unencrypted payload;

the first key comprises a transport layer session encryption key; and the at least one value comprises a cryptographic initialization vector.

10. The method of claim 9, wherein:

the circuitry is comprised at least in part in an intermediate node to receive, at least in part, the packet after the packet is issued from a client node for reception by a server node.

11. The method of claim 8, wherein:

a circuit card includes, at least in part, the circuitry, the circuit card being capable of being coupled to a circuit board, a server node, and a client node.

12. The method of claim 8, wherein:

the second key is generated based at least in part upon a third key and at least one other value, the third key being associated with a domain, the domain including a client node and a server node, the at least one other value being generated based at least in part upon identifiers of the client node and the server node.

13. The method of claim 12, wherein:

the third key is generated, at least in part, by a domain authority that distributes, at least in part, the third key to an intermediate node and to the server node, but maintains the third key in secrecy from the client node; and the second key is generated based at least in part upon a one-way function involving the third key and the at least one other value.

14. Computer-readable memory storing one or more instructions that when executed by a machine result in execution of operations comprising:

at least one of generating, at least in part, and receiving, at least in part, a packet, the packet including at least one field and an encrypted payload, the at least one field including, at least in part, at least one of a first key and at least one value, the at least one of the first key and at least one value, as included in the at least one field, being encrypted by a second key, the encrypted payload being capable of being decrypted, at least in part, based, at least in part, upon the at least one of the first key and the at least one value to yield an unencrypted payload, the unencrypted payload including at least a portion of application layer data, the application layer data to be communicated in a secure session;

the at least one field comprising at least one of:
one or more protocol header option fields; and
one or more protocol header reserved fields;

the operations to be executed, at least in part, by circuitry to be comprised, at least in part, in a network node that is to be communicatively coupled to another network node that is to receive the packet;

if the another network node is incapable of processing the at least one field and is to operate in accordance with a technique that does not utilize the at least one field, the circuitry is to remove from the packet the at least one field to generate another packet that lacks the at least one field so as to permit the another packet to be backward compatible with the another network node, and the circuitry is to issue, at least in part, the another packet to the another network node;

the packet being one of a plurality of packets that comprise respective encrypted transmission control protocol payloads, respective fields, and respective values, the respective fields and respective values including information to permit the circuitry to perform packet-by-packet decryption, inspection, and validity check of each of the respective encrypted transmission control protocol payloads independently of others of the respective encrypted transmission control protocol payloads and without first re-assembling an entirety of the application layer data; and if the another network node is capable of processing the at least one field, the information being to provide to the another network node cryptographic state and hash value information based upon the entirely of the application layer data.

15. The memory of claim 14, wherein:
the at least one field includes both the first key and the at least one value, the first key and the at least one value, as included in the at least one field, being encrypted by the second key;
the packet also includes a hash value to be used to check, at least in part, payload validity, the hash value being generated based at least in part upon a third key and at least one of the encrypted payload and the unencrypted payload;
the first key comprises a transport layer session encryption key; and
the at least one value comprises a cryptographic initialization vector.

16. The memory of claim 15, wherein:
circuitry is comprised at least in part in an intermediate node to receive, at least in part, the packet after the packet is issued from a client node for reception by a server node.

17. The memory of claim 14, wherein:
a circuit card includes, at least in part, the circuitry, the circuit card being capable of being coupled to a circuit board, a server node, and a client node.

18. The memory of claim 14, wherein:
the second key is generated based at least in part upon a third key and at least one other value, the third key being associated with a domain, the domain including a client node and a server node, the at least one other value being generated based at least in part upon identifiers of the client node and the server node.

19. The memory of claim 18, wherein:
the third key is generated, at least in part, by a domain authority that distributes, at least in part, the third key to an intermediate node and to the server node, but maintains the third key in secrecy from the client node; and
the second key is generated based at least in part upon a one-way function involving the third key and the at least one other value.

* * * * *